(12) United States Patent
Jia et al.

(10) Patent No.: US 6,935,275 B2
(45) Date of Patent: Aug. 30, 2005

(54) DENTAL CHEW ROLL AND METHOD OF MAKING THE SAME

(75) Inventors: Tiandong Jia, Somerset, NJ (US); Sharon McNamara, Kinnelon, NJ (US); Robert Sulikowski, East Rutherford, NJ (US)

(73) Assignee: The Hartz Mountain Corporation, Secaucus, NJ (US)

( * ) Notice: Subject to any disclaimer, the term of this patent is extended or adjusted under 35 U.S.C. 154(b) by 0 days.

(21) Appl. No.: 10/758,962

(22) Filed: Jan. 16, 2004

(65) Prior Publication Data

US 2004/0237904 A1 Dec. 2, 2004

Related U.S. Application Data

(60) Provisional application No. 60/470,702, filed on May 15, 2003.

(51) Int. Cl.[7] .................................................. A01K 29/00
(52) U.S. Cl. ........................................................ 119/710
(58) Field of Search ................................ 119/709, 710, 119/711; 426/92, 132, 641

(56) References Cited

U.S. PATENT DOCUMENTS

| | | | |
|---|---|---|---|
| 2,003,958 A | 6/1935 | Salisbury | |
| 2,185,547 A | 1/1940 | Fowler | |
| 2,988,045 A | 6/1961 | Fisher | |
| 3,107,651 A | * 10/1963 | Beck ........................... | 119/709 |
| 3,368,528 A | 2/1968 | Ganoe | |
| 3,882,257 A | 5/1975 | Cagle | |
| 3,899,607 A | 8/1975 | Miller et al. | |
| 4,032,665 A | 6/1977 | Miller et al. | |
| 4,126,705 A | 11/1978 | Hait | |
| 4,163,804 A | 8/1979 | Meyer et al. | |
| 4,239,785 A | 12/1980 | Roth | |
| 4,260,635 A | 4/1981 | Fisher | |
| 4,364,925 A | 12/1982 | Fisher | |
| 4,366,175 A | 12/1982 | Brown et al. | |
| 4,454,163 A | 6/1984 | Gellman et al. | |
| 4,508,741 A | 4/1985 | Corbett | |
| 4,513,014 A | 4/1985 | Edwards | |
| 4,534,989 A | 8/1985 | Gellman et al. | |
| 4,535,725 A | * 8/1985 | Fisher ......................... | 119/709 |
| 4,546,001 A | 10/1985 | Gellman et al. | |
| 4,557,219 A | 12/1985 | Edwards | |
| 4,674,444 A | 6/1987 | Axelrod | |
| 4,681,758 A | 7/1987 | Fruthaler et al. | |
| 4,738,864 A | 4/1988 | Erbster | |
| 4,743,459 A | 5/1988 | Gellman et al. | |
| 4,743,460 A | 5/1988 | Gellman et al. | |
| 4,743,461 A | 5/1988 | Gellman et al. | |
| 4,763,604 A | 8/1988 | Meekins | |

(Continued)

FOREIGN PATENT DOCUMENTS

| | | |
|---|---|---|
| DE | 3918631 | 12/1990 |
| EP | 0 769 565 A1 | 9/1997 |
| EP | 0838153 A1 | 4/1998 |
| EP | 1151674 | 11/2001 |
| GB | 2258600 A | 2/1993 |
| JP | 05-192095 | 8/1993 |
| JP | 05-304899 | 11/1993 |
| JP | 11127796 A | 5/1999 |
| WO | WO 01/50882 A2 | 7/2001 |

*Primary Examiner*—Robert P. Swiatek
(74) *Attorney, Agent, or Firm*—Jeffrey M. Kaden; Gottlieb, Rackman & Reisman, P.C.

(57) ABSTRACT

A dental dog chew roll is cut from a flavored and colored hide piece. The hide pieced is rolled to form into a cylindrical body with two ends, with strips of the hide extending from the cylindrical body. Optionally, cuts are made in the body to provide more surface area. Preferably, the hide piece is made from a large animal hide that is cleaned, infused with flavor and dried.

29 Claims, 1 Drawing Sheet

U.S. PATENT DOCUMENTS

| | | |
|---|---|---|
| 4,771,733 A | 9/1988 | Axelrod |
| 4,800,099 A | 1/1989 | Gellman et al. |
| 4,822,626 A | 4/1989 | Spanier et al. |
| 4,851,249 A | 7/1989 | Hamano |
| 4,857,333 A | 8/1989 | Harold |
| 4,868,002 A | 9/1989 | Scaglione et al. |
| 4,880,642 A | 11/1989 | Berends |
| 4,886,440 A | 12/1989 | Forrest |
| 4,892,748 A | 1/1990 | Anderson et al. |
| 4,997,671 A | 3/1991 | Spanier |
| 5,000,943 A | 3/1991 | Scaglione et al. |
| 5,026,572 A | 6/1991 | Neiberger |
| 5,045,339 A | 9/1991 | Ducharme |
| 5,149,550 A | 9/1992 | Mohilef |
| 5,200,212 A | 4/1993 | Axelrod |
| 5,215,038 A | 6/1993 | O'Rourke |
| 5,240,720 A | 8/1993 | Axelrod |
| 5,339,771 A | 8/1994 | Axelrod |
| 5,407,661 A | 4/1995 | Simone et al. |
| 5,419,283 A | 5/1995 | Leo |
| 5,467,741 A | 11/1995 | O'Rourke |
| 5,476,069 A | 12/1995 | Axelrod |
| 5,532,010 A | 7/1996 | Spanier et al. |
| 5,560,320 A | 10/1996 | Plunk |
| 5,618,518 A | 4/1997 | Stookey |
| 5,635,237 A | 6/1997 | Greenberg et al. |
| 5,673,653 A | 10/1997 | Sherrill |
| 5,706,762 A * | 1/1998 | Dokken .................. 119/712 |
| 5,711,254 A | 1/1998 | O'Rourke |
| 5,750,196 A | 5/1998 | Welch |
| 5,832,877 A | 11/1998 | Markham |
| 5,894,029 A | 4/1999 | Brown et al. |
| 5,897,893 A | 4/1999 | Mohilef |
| 5,912,285 A | 6/1999 | Godsey |
| 5,939,112 A | 8/1999 | Katayama et al. |
| 5,941,197 A | 8/1999 | Axelrod |
| 5,947,060 A | 9/1999 | Weinacker |
| 5,965,182 A * | 10/1999 | Lindgren .................. 426/104 |
| 6,033,715 A | 3/2000 | Lynch |
| 6,042,873 A | 3/2000 | Lawson |
| 6,044,800 A | 4/2000 | Kubo et al. |
| 6,060,100 A | 5/2000 | Koller |
| 6,093,427 A | 7/2000 | Axelrod |
| 6,129,053 A | 10/2000 | Markham et al. |
| 6,165,474 A | 12/2000 | Frudakis et al. |
| 6,200,616 B1 | 3/2001 | Axelrod |
| 6,202,598 B1 | 3/2001 | Willinger |
| 6,238,715 B1 | 5/2001 | Baikie |
| 6,250,254 B1 | 6/2001 | Weinacker |
| 6,274,182 B1 | 8/2001 | Axelrod et al. |
| 6,277,420 B1 | 8/2001 | Anderson et al. |
| 6,379,725 B1 | 4/2002 | Wang et al. |
| 6,444,243 B1 | 9/2002 | Duensing et al. |
| 6,455,083 B1 | 9/2002 | Wang |
| 2002/0119224 A1 | 8/2002 | Axelrod et al. |
| 2002/0142091 A1 | 10/2002 | Zhu |
| 2003/0106500 A1 * | 6/2003 | Kirch .................. 119/710 |

* cited by examiner

DENTAL CHEW ROLL AND METHOD OF MAKING THE SAME

RELATED APPLICATIONS

This application claims priority to provisional application Ser. No. 60/470,702, filed May 15, 2003, incorporated herein by reference.

FIELD OF INVENTION

This invention is related to dog chews, and more particularly to a chew roll for dogs that is infused with a flavor and/or color. The chew roll is preferably made from animal hide and has cuts to increase its effective surface area. The roll is more attractive to animals and its enhanced flavor and color characteristics will induce the animals to chew the roll for a longer time.

BACKGROUND OF THE INVENTION

A known rawhide for a dog is made from animal hide, particularly from cow hide. Cow hide from a tannery is cleaned so that it does not have any meat or other undesirable deposits. As part of the cleaning process, the cow hide is washed by water, delimed, degreased, bleached and washed again. The cleaned hide is then dried, and then cut to pieces. The cut pieces are formed into predetermined shape, such as a roll having the general shape of a bone.

Next, flavors and colors are added by basting the rolled hide piece under static conditions, i.e., without agitation or other active means of speeding up infusion. The pre-formed and pre-dried rawhide is then dried a second time.

This process and the resulting product have several disadvantages. First, the flavors and colors form a coating only to the outer surface of the product. Another disadvantage is that even on the outer surface, the coating is uneven, giving the product an esthetically undesirable and unpleasant appearance. A third disadvantage is that the process requires two different drying steps. Therefore the process is time consuming, inefficient and wastes energy.

SUMMARY OF THE INVENTION

Briefly, chews roll are prepared in accordance with this invention as follows. An animal hide is cleaned and processed. The cleaned hide is then infused with flavor and color, cut into hide pieces and formed into rolls, each roll having a body with a generally cylindrical shape and two ends with strips extending generally longitudinally, in parallel to the axis of the roll. The roll is also provided with cuts that form crescent-shaped windows. The roll is then dried.

This process allows the flavors and colors to coat and penetrate the hide in a uniformed, consistent manner. The coating extends over both outer and inner surfaces of the roll. Only one drying step is used to save heating energy and heating equipment as compared to a traditional basting process. Preferably during infusion, the hide and the bath in which the hide is introduced are agitated to speed the coating and infusion process.

As discussed above, traditionally, flavor and color was added to the hide by basting. The invention provides a new way to add color and flavor uniformly to the inner and outer surface of the dog chew, and eliminates a drying step. Moreover the resulting product has a unique physical shape combining the advantage of long last chewing and more effective teeth cleaning into one chewing toy.

DETAILED DESCRIPTION OF THE INVENTION

Figure 1:
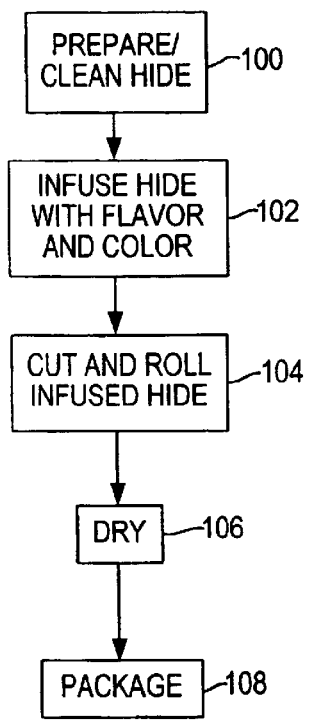
FIG. 1 shows a flow chart for the process for making the dog chew roll in accordance with this invention.

The novel method of making dental chew rolls and their structure is now described in conjunction with the figures. Starting with FIG. 1, step 100, a hide from a tannery, or other sources, is prepared and cleaned so that it can be used to make chew rolls. This step may include several standard processes, such as washing with water, deliming, degreasing and bleaching. Some of these processes may be repeated, if necessary. The hide is preferably cow hide, however, other hides can be used, including hides from beef, pigs, and other animals.

The clean hide is then treated or infused with flavors and coloring materials in step 102 using a bath or slurry. Flavors, such as meat flavors, and colors for chew chips and other pet products are well known in the art. Generally, food flavors may include natural ingredients such as meats and meat byproducts derived from poultry, beef, pork, lamb, smoke and other materials, including flavor enhancers. Food colors may be added separately, or the flavor ingredients may have coloring characteristics as well, in which case separate color ingredients may not be required. For example, a smoke flavor also provides color to the final product.

In the present invention, a bath is prepared by adding flavor and color to water and mixing thoroughly, until the bath is uniform. The bath is introduced into a drum (or alternatively, the bath ingredients are added and mixed within the drum). A different type of container may be used for the bath as well.

Next, the hide is introduced into the drum and submerged into the bath. Initially, the hide may have a water content of about 60–80%. After the hide is introduced into the bath, the hide and the bath are mixed, using, for instance, mechanical agitation, for sufficient time to allow the flavor and color ingredients to infuse the hide thoroughly. The concentration of flavors and colors in the bath are selected so that they are high enough to insure the infusion takes place quickly and efficiently.

After infusion, the drum is drained, and the hide is removed.

Figure 2:
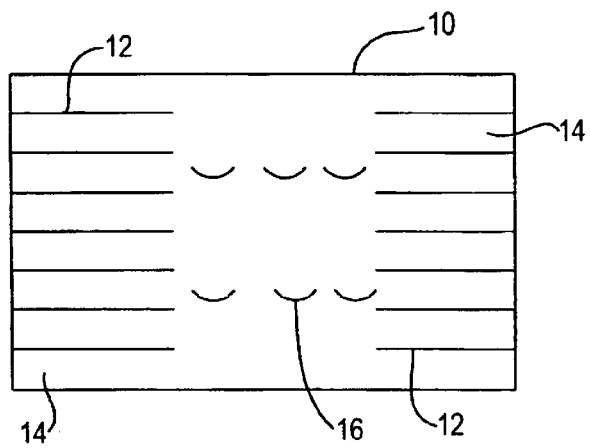
FIG. 2 shows a plan view of a hide piece shaped to form a roll.

Next, in step 104 the infused hide is cut into smaller, generally rectangular pieces. One such hide piece is shown in FIG. 2. It should be understood that while the sides of the hide piece are shown as being straight, they may be curved or may have an irregular shape. Importantly, a plurality of longitudinal cuts 12 are made on the lateral sides of the hide pieces to define therebetween elongated hide strips 14. Typically, each strip may be about 2.5 and 8 cm. long and about 1.0 cm. wide. Additional cuts 16 may also be provided in the flat portion of the hide piece 10 disposed between the strips 14. The cuts 16 may have arcuate shapes, as indicated in FIG. 2. The cuts 12, 16 may be made at the same time as the hide piece 10 is cut from the hide, using for example a die, or may be made in the hide piece at a later time.

As part of step 104, the hide piece 10 is rolled into a generally cylindrical form. The rolled up piece is maintained in this shape by applying a food grade adhesive, or by other similar means.

In step 106 a plurality of flavored and rolled up hide pieces are dried using standard techniques. For example, the flavored hide pieces can be deposited on a tray and inserted in an oven where they are kept for up to seven days at 35–85° C.

Figure 3:
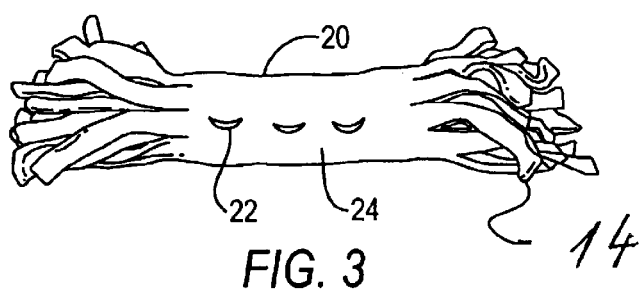
FIG. 3 shows the completed dog chew roll.

The finished chew roll 20 is shown in FIG. 3. As can be seen in this Figure, the hide piece of FIG. 3 is rolled up spirally to form a cylindrical shape with strips 14 extending somewhat longitudinally from the main body of the roll to form streamers. The cuts 16 form crescent-shaped windows 22 on the lateral cylindrical surface 24 of the roll that allow the flavors and colors to penetrate the internal surfaces of the roll and to make the roll easier to chew. The overall length of the chew roll of FIG. 3 is between about 4 and 9 inches, with a diameter of between about 2.0 and 4.0 cm.

When a dog chews the center part of the roll, this part will act as a toothbrush to clean the surfaces of the dog's teeth. This action is assisted by the windows 22 which are penetrated by the dog's teeth. When the dog chews on the ends, the strips 14 act as a floss to clean the spaces between the teeth.

To summarize, a cleaned hide is coated or infused with flavor and (optionally) color, then cut, formed and dried to form dental chew rolls with a plurality of internal cuts and strips or streamers at the two ends. This process allows the flavors and colors to be applied to the hide in a uniform, consistent way. The flavors and colors are infused in both the outer and inner surfaces of the rolls.

The resulting dental chew rolls provide much more contact surface between the dog teeth and the dental chew rolls and make the product clean the dog teeth more effectively.

The inventive process for making dental chew rolls may be modified to achieve various beneficial results. For example, the infusion can be performed in vacuum or under pressure. This type of process may cause the flavors and colors to penetrate and infuse the hide faster.

While the invention has been described with reference to several particular embodiments, it is to be understood that these embodiments are merely illustrative of the principles of the invention. Accordingly, the embodiments described in particular should be considered as exemplary, not limiting, with respect to the following claims.

We claim:

1. A method of making chew rolls comprising:
   providing a clean hide;
   infusing the clean hide with an ingredient including at least one of a food color and food flavor to form an infused hide;
   cutting the hide to make hide pieces having two opposed sides;
   providing the hide pieces with a plurality of holes;
   rolling the hide pieces into individual rolls; and
   drying the rolled hide pieces to make chew rolls, said chew rolls having a taste or appearance attractive to an animal due to said at least one of said food color and food flavor;
   said holes being arranged and constructed to promote dental health when the chew rolls are chewed by a mammal.

2. The method of claim 1 further comprising forming the chew rolls with crescent shaped windows shaped and sized to promote dental health when the rolls are chewed by a mammal.

3. The method of claim 1 wherein said hide is infused with a mixture including a food flavor and a food color.

4. The method of claim 1 further comprising forming strips of said hide at least on one side of the hide pieces, said strips defining dental floss.

5. A method of making dental chew rolls comprising:
   preparing a clean hide by processing an animal skin;
   infusing the clean hide with at least one of a flavor and color to make an infused hide;
   cutting the infused hide into hide pieces having ends;
   forming on said hide piece ends elongated strips;
   rolling said hide pieces into cylindrical shapes with the elongated strips extending from said ends; and
   drying the hide pieces to make chew rolls.

6. The method of claim 5 further comprising providing in said hide pieces a plurality of internal cuts along a lateral surface.

7. The method of claim 6 wherein said internal cuts extend through the hide pieces and are arranged and constructed to promote dental health.

8. The method of claim 6 wherein said internal cuts are arranged in a two-dimensional army.

9. The method of claim 5 wherein said strips extend longitudinally, generally in parallel to the longitudinal axes of the cylindrical shapes.

10. The method of claim 5 further comprising agitating said hides during said infusing step.

11. The method of claim 5 wherein said strips are sized and shaped to form dental floss.

12. A dental chew roll comprising:
    a generally cylindrical body with a lateral cylindrical surface and two ends; and strips integrally formed with the body and extending longitudinally at said two ends, said strips and said body being sized and shaped to improve the dental characteristics of the roll when chewed by an animal;
    wherein said lateral cylindrical surface is formed with a plurality of cuts arranged in a two-dimensional array.

13. The dental chew roll of claim 12 wherein said body has cuts formed as crescent shaped windows.

14. The dental chew roll of claim 12 wherein said body comprises a hide piece rolled into a spiral about a longitudinal axis so that several portions of the hide piece overlap with said strips extending generally along said longitudinal axis.

15. The dental chew roll of claim 12 further comprising a coating on said body, said coating being made of at least one of a flavor and a color.

16. The dental chew roll of claim 12 wherein said body has a length in the range of between about 4 and 9 inches and a diameter in the range of between about 2.0 and 4.0 cm.

17. The dental chew roll of claim 12 wherein said strips are shaped and sized to form dental floss.

18. The dental chew roll of claim 17 wherein said strips are between 2.5 and 8 cm long.

19. The dental chew roll of claim 17 wherein said strips are about 1 cm wide.

20. The dental chew of claim 12 wherein said body includes a sheet of animal hide, said hide having parallel cuts to form said strips.

21. A method of making chew rolls comprising:
    providing a clean hide;
    infusing the clean hide with an ingredient including at least one of a food color and food flavor to form an infused hide;
    cutting the hide to make hide pieces having two opposed sides;
    rolling the hide pieces into individual rolls;
    drying the rolled hide pieces to make chew rolls, said chew rolls having a taste or appearance attractive to an animal due to said at least one of said food color and food flavor; and forming the chew rolls with crescent shaped windows shaped and sized to promote dental health when the rolls are chewed by a mammal.

22. A method of making chew rolls comprising:

providing a clean hide;

infusing the clean hide with an ingredient including at least one of a food color and food flavor to form an infused hide;

cutting the hide to make hide pieces having two opposed sides;

forming strips of said hide at least on one side of the hide pieces, said strips defining dental floss;

rolling the hide pieces into individual rolls; and drying the rolled hide pieces to make chew rolls, said chew rolls having a taste or appearance attractive to an animal due to said at least one of said food color and food flavor.

23. The method of claim 22 further comprising forming strips on both sides of the hide pieces.

24. The method of claim 23 further comprising cutting said pieces along said sides to form said strips.

25. The method of claim 24 wherein said strips extend generally in parallel to a longitudinal axis of the chew roll.

26. A dental chew roll comprising:

a generally cylindrical body with a lateral cylindrical surface and two ends; and strips integrally formed with the body and extending longitudinally at said two ends, said strips and said body being sized and shaped to improve the dental characteristics of the roll when chewed by an animal;

wherein said body has cuts formed as crescent shaped windows.

27. The dental chew roll of claim 26 wherein said body comprises a hide piece rolled into a spiral about a longitudinal axis so that several portions of the hide piece overlap with said strips extending generally along said longitudinal axis.

28. A dental chew roll comprising:

a generally cylindrical body with a lateral cylindrical surface and two ends; and strips integrally formed with the body and extending longitudinally at said two ends, said strips and said body being sized and shaped to improve the dental characteristics of the roll when chewed by an animal;

wherein said strips are shaped and sized to form dental floss and are about 1 cm wide.

29. A dental chew roll comprising:

a generally cylindrical body with a lateral cylindrical surface and two ends; and strips integrally formed with the body and extending longitudinally at said two ends, said strips and said body being sized and shaped to improve the dental characteristics of the roll when chewed by an animal;

wherein said body includes a sheet of animal hide, said hide having parallel cuts to form said strips.

* * * * *